US009553450B2

(12) United States Patent
White, III et al.

(10) Patent No.: US 9,553,450 B2
(45) Date of Patent: Jan. 24, 2017

(54) SYSTEMS AND METHODS OF CONTROLLING POWER

(71) Applicant: SCHNEIDER ELECTRIC BUILDINGS, LLC, Palatine, IL (US)

(72) Inventors: William Anthony White, III, Carlisle, MA (US); Christopher J. Howard, Greenland, NH (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 914 days.

(21) Appl. No.: 13/645,151

(22) Filed: Oct. 4, 2012

(65) Prior Publication Data

US 2014/0098842 A1    Apr. 10, 2014

(51) Int. Cl.
| | |
|---|---|
| H02J 3/00 | (2006.01) |
| H04L 12/10 | (2006.01) |
| H04L 12/12 | (2006.01) |
| H04L 12/40 | (2006.01) |
| H04L 12/413 | (2006.01) |

(52) U.S. Cl.
CPC ............... *H02J 3/00* (2013.01); *H04L 12/10* (2013.01); *H04L 12/12* (2013.01); *H04L 12/40045* (2013.01); *H04L 12/413* (2013.01); *Y02B 60/34* (2013.01)

(58) Field of Classification Search
None
See application file for complete search history.

(56) References Cited

U.S. PATENT DOCUMENTS

| | | | |
|---|---|---|---|
| 4,701,946 A | 10/1987 | Oliva et al. | |
| 6,445,087 B1 * | 9/2002 | Wang | H01R 25/003 307/139 |
| 6,507,273 B1 | 1/2003 | Chang et al. | |
| 6,744,150 B2 | 6/2004 | Rendic | |
| 2003/0102717 A1 | 6/2003 | Tarr | |
| 2006/0290208 A1 | 12/2006 | Chang et al. | |
| 2008/0140565 A1 | 6/2008 | DeBenedetti et al. | |
| 2008/0218000 A1 | 9/2008 | Ohshiro et al. | |
| 2009/0085586 A1 | 4/2009 | Anderson | |
| 2010/0145543 A1 * | 6/2010 | Middlemiss | G06F 1/266 700/295 |
| 2010/0181835 A1 * | 7/2010 | Ulmer | G06F 1/266 307/38 |
| 2010/0223480 A1 * | 9/2010 | Fratti | H04L 12/10 713/300 |

(Continued)

FOREIGN PATENT DOCUMENTS

DE    102007028180 A1    1/2009

OTHER PUBLICATIONS

International Search Report and Written Opinion from corresponding PCT/US2013/063137 dated Mar. 5, 2014.

*Primary Examiner* — Jared Fureman
*Assistant Examiner* — Joel Barnett
(74) *Attorney, Agent, or Firm* — Lando & Anastasi, LLP (57) ABSTRACT

According to another embodiment, a power control apparatus is provided. The power control apparatus includes a grid power inlet configured to receive grid power, a grid power outlet configured to provide grid power, a data transmission input configured to receive low voltage power, and means for actuating a relay to selectively couple the grid power inlet to the grid power outlet in response to receiving the low voltage power from the data transmission input.

18 Claims, 6 Drawing Sheets

(56) References Cited

U.S. PATENT DOCUMENTS

2011/0241425 A1 10/2011 Hunter, Jr. et al.
2011/0320833 A1* 12/2011 R. .......................... H04L 12/12
                                                            713/310

* cited by examiner

SYSTEMS AND METHODS OF CONTROLLING POWER

BACKGROUND

Technical Field

The technical field relates generally to monitoring usage of utilities and, more particularly, to methods and systems of controlling power usage within commercial and residential structures.

Background Discussion

Building management systems control and conserve resources consumed by the operation of subsystems within buildings and other structures. The subsystems managed by a typical building management system include power supply, environmental control, lighting control, security and fire protection subsystems. The amount of resources consumed by these subsystems is substantial—nearing 70% of the total resources consumed within a building according to some estimates.

Conventional building management systems are implemented using a variety of standards and computing technologies. Some building management systems employ a hierarchical architecture in which management and configuration devices are connected to one another via a network. Under this architecture, each of the management and configuration devices is also connected to one or more control devices that monitor and control the operation of a subsystem of the building. The management and configuration devices allow users to initially configure, monitor and alter the behavior of the subsystems controlled by the control devices. Management and configuration devices are typically implemented using general purpose computer systems, such as a personal computer or laptop. Control devices are often proprietary, special purpose devices that include environmental sensors and that can alter the operation of a particular subsystem.

SUMMARY

Embodiments disclosed herein are directed to apparatus and processes for managing plug loads, which are generally considered to be unmanageable in a cost efficient manner using conventional technology. Management of plug loads is difficult because the plug loads can be easily added, removed, or relocated by occupants, and thus are difficult to control. However, embodiments disclosed herein reflect an understanding that there are many plug loads that are static and amenable to management.

For example, conventional projectors are often permanently affixed to the building structure and consume excess power by remaining on standby, even when not in active use. However, projectors are typically not controlled by an integrated energy management system. By providing a method of powering & depowering plug loads, such as projectors, additional energy savings may be realized.

According to at least some embodiments, a power control system is provided. The power control system includes a power control apparatus. The power control the power control apparatus includes a grid power inlet configured to receive grid power, a grid power outlet configured to provide grid power, a data transmission input configured to receive low voltage power, and a relay coupled to the data transmission input, the grid power inlet and the grid power outlet. The relay is configured to selectively couple the grid power inlet to the grid power outlet in response to receiving the low voltage power from the data transmission input.

In the power control system, the relay may be configured to open in response to receiving the low voltage power, thereby decoupling the grid power inlet from the grid power outlet. The relay may also be configured to close in response to receiving the low voltage power, thereby coupling the grid power inlet to the grid power outlet. The power control apparatus may further include a controller configured to negotiate provision of the low voltage power. The power control apparatus may further include a switch configured to selectively couple the data transmission input to the relay.

The power control apparatus may further include a data transmission output. The power control apparatus may be further configured to receive a communication signal via the data transmission input and transmit the communication signal via the data transmission output. The power control apparatus may be configured to provide residual low voltage power to the data transmission output.

The power control system may further comprise a PoE management system including power sourcing equipment. The power sourcing equipment may be configured to provide the low voltage power to the power control apparatus. The PoE management system may control provision of the low voltage power via the ENERGYWISE protocol. The power control system may further comprise a load coupled to the grid power outlet. The PoE management system may control provision of grid power received at the grid power inlet to the load.

According to another embodiment, a method of managing provision of grid power using a power control apparatus is provided. The power control apparatus includes a relay coupled to a source of the grid power and configured to actuate in response to receipt of low voltage power. The method includes an act of altering the provision of the grid power by providing the low voltage power to a control input of the relay.

In the method, the act of altering the provision of the grid power may include an act of decoupling the source of the grid power from an output for the grid power. The act of altering the provision of the grid power may also include an act of coupling the source of the grid power to an output for the grid power.

In the method, the act of providing the low voltage power to the control input of the relay may include an act of negotiating provision of the low voltage power with a source of the low voltage power. The act of providing the low voltage power to the control input of the relay may include an act of coupling a source of the low voltage power to the control input of the relay.

The method may further include an act of providing, by the power control apparatus, residual low voltage power. The method may further include an act of providing, by a PoE management system including power sourcing equipment, the low voltage power to the power control apparatus. In the method, the act of providing the low voltage power to the power control apparatus may include an act of reading stored information encoded according to the ENERGYWISE protocol. The method may further include an act of providing the grid power from the source to a load coupled to the power control apparatus.

According to another embodiment, a power control apparatus is provided. The power control apparatus includes a grid power inlet configured to receive grid power, a grid power outlet configured to provide grid power, a data transmission input configured to receive low voltage power, and means for actuating a relay to selectively couple the grid power inlet to the grid power outlet in response to receiving the low voltage power from the PoE input.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

In at least one embodiment, an apparatus is provided that is configured to control one or more plug loads. The apparatus includes a control power input, a grid (or "mains") power input, a grid power output, and a relay. The relay is coupled to the control power input. In one embodiment, power applied to the control power input closes the relay. In this embodiment, absence of applied power to the control power input opens the relay. In another embodiment, power applied to the control power input opens the relay. In this embodiment, absence of applied power to the control power input closed the relay. When closed, the relay completes a circuit that includes the grid power input and the grid power output. When open, the relay breaks the circuit between the grid power input and the grid power output. The grid power output may be coupled to a plug load, thereby providing simple on/off control of the plug loads.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Power Control Apparatus

Figure 1:
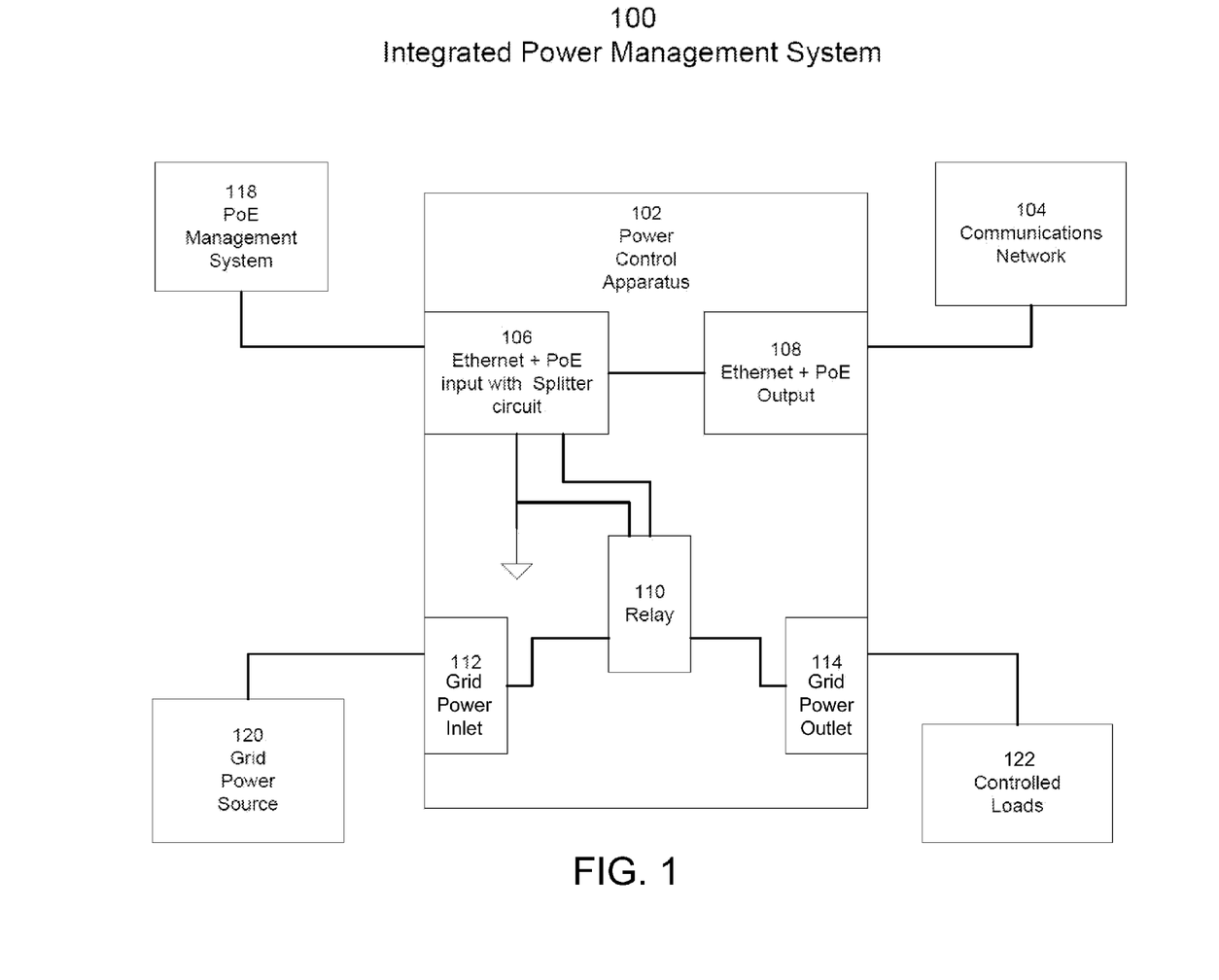
FIG. 1 is a context diagram that includes a power control apparatus.

Various embodiments disclosed herein provide for an apparatus that economically provides centralized control of plug loads, thereby allowing the plug loads to be incorporated into an integrated power management system. In some embodiments, the apparatus is configured such that power supplied over a data transmission medium, such as a telephone line or an Ethernet cable, controls provision of grid power to the plug load. FIG. 1 illustrates an example of such an apparatus, a power control apparatus 102, within the context of a portion of an integrated power management system 100.

As shown in FIG. 1, the integrated power management system 100 includes the power control apparatus 102, a communications network 104, a Power over Ethernet ("PoE") management system 118, a grid power source 120, and one or more controlled loads 122. The network 104 may include any network through which computer systems exchange (i.e., send or receive) information. In various examples, the network 104 implements a variety of networking standards including Ethernet and Power over Ethernet standards. In the embodiment illustrated in FIG. 1, the PoE management system 118 includes one or more pieces of PoE power sourcing equipment and is configured to control the provision of PoE power to the power control device 102 using a version (e.g., version 2) of the CISCO ENERGY-WISE protocol, as defined by Cisco Systems, Inc. of San Jose, Calif. One example of the PoE management system 118 is described further within co-pending U.S. patent Ser. No. 13/163,796, entitled "ENERGY MANAGEMENT GATEWAYS AND PROCESSES," filed on Jun. 20, 2011, which is hereby incorporated herein by reference in its entirety.

In the embodiment illustrated in FIG. 1, the power control apparatus 102 includes a Ethernet+PoE input 106, a Ethernet+PoE output 108, a relay 110, a grid power inlet 112, and a grid power outlet 114. The grid power inlet 112 is coupled to the grid power source 120. The grid power outlet 114 is coupled to the one or more controlled loads 122.

As shown in FIG. 1, the Ethernet+PoE input 106 is coupled to the Ethernet+PoE output 108 and the relay 110. The relay 110 is coupled to the grid power inlet 112 and the grid power outlet 114. In some embodiments, the Ethernet+PoE input 106 incorporates a PoE splitter that directs at least a portion of the PoE power provided to the Ethernet+PoE input 106 to the relay 110. The PoE splitter may also direct a residual portion of the PoE power and the Ethernet signal to the Ethernet+PoE output 108.

In the embodiment shown in FIG. 1, the relay 110 is coupled to the Ethernet+PoE input 106 via the PoE splitter. The relay 110 is configured to actuate in response to provision of PoE power (or lack thereof) via the Ethernet+PoE input 106. More specifically, in some embodiments, the relay 110 is configured to close when PoE power is present and to open when PoE power is absent. When closed, the relay 110 completes a circuit that includes the grid power inlet 112 and the grid power outlet 114, thereby coupling the grid power inlet 112 to the grid power outlet 114. When open, the relay 110 breaks the circuit between the grid power inlet 112 and the grid power outlet 114, thereby decoupling the grid power inlet 112 from the grid power outlet 114. According to this arrangement, where the grid power inlet 112 is coupled to grid power (for example, plugged into a typical wall outlet) and the grid power outlet 114 is coupled to a plug load, the relay 110 enables or disables supply of grid power to the plug load. Moreover, where the PoE management system 118 is coupled to the Ethernet+PoE input 106 via suitable Ethernet cabling, the PoE management system 118 may control the flow of grid power to the plug load by providing, or not providing, PoE power to the Ethernet+PoE input 106. In some embodiments, the power control apparatus 102 includes one or more light emitting diodes to indicate whether or not PoE power is being provided to the Ethernet+PoE input 106.

In some embodiments, the Ethernet+PoE input 106 is coupled to a PoE power sourcing equipment (PSE) controller. In these embodiments, the PoE power that is received via the Ethernet+PoE input 106 is passed through the PSE controller and output via the Ethernet+PoE output 108. Thus in some embodiments, the power control apparatus 102 acts as a provider of PoE power (such as the residual PoE power described above) and data to devices connected to the Ethernet+PoE output 108. In addition, it is to be appreciated that, in some examples, the Ethernet+PoE input 106 receives PoE power but no Ethernet signal. Such examples fall within the scope of the embodiments disclosed herein.

Applicants appreciate that embodiments in accord with FIG. 1 can be manufactured for a low cost but that PoE ports may cost $100 or more per port. Even so, there are several cost effective applications for which the power control apparatus 102 is suitable. For example, in some cases, the cost of the power control apparatus 102 and the PoE port may be offset by the cost savings generated from management of a sufficiently large load.

In some cases where the plug load requires network connectivity (such, for example, a projector), the incremental cost of controlling the plug load is the cost of the power control apparatus 102. By passing the Ethernet through the power control apparatus 102 to the plug load, no additional port is required, and the grid power to the plug load is controlled via PoE.

In other cases where the plug load does not require network connectivity, the power control apparatus 102 may pass nearly all of the PoE power through the Ethernet+PoE output 108 as residual PoE power because only a small amount of the PoE power is required for the power control apparatus 102 to operate. Thus in some examples, a plurality of plug loads may be controlled via a single PoE port, thereby compounding the energy saving attributable to the PoE port.

Figure 2:
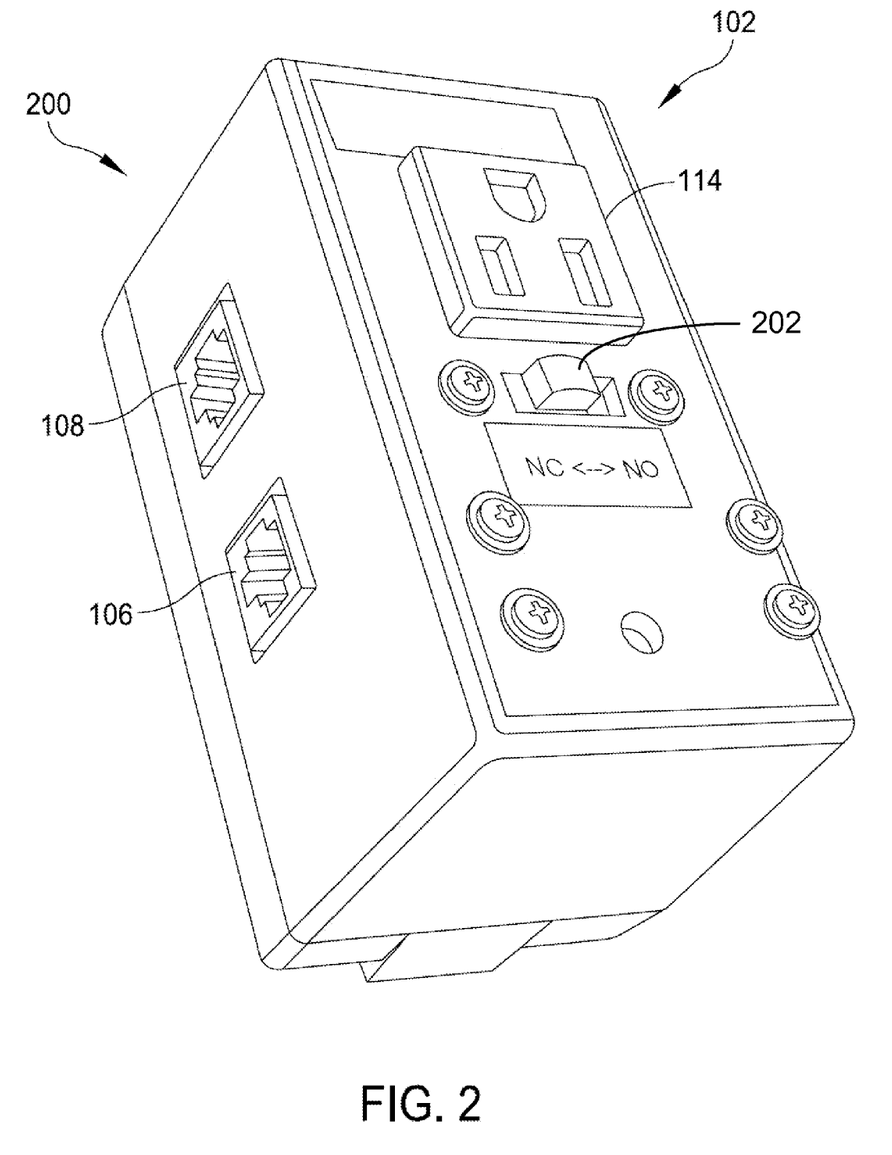
FIG. 2 is a perspective view of the front of one example of the power control apparatus.

FIG. 2 shows a perspective view of the front and a side of one embodiment of the power control apparatus 102. As shown in FIG. 2, the power control apparatus 102 includes a housing 200 and a switch 202. The front of the housing 200 includes apertures through which the switch 202 and the grid power outlet 114 extend. The grid power outlet 114 shown in FIG. 2 is configured according to the U.S. National Electrical Manufacturers Association ("NEMA") 5-15 standard. In other embodiments, the grid power outlet 114 is configured according to other standards and embodiments are not limited to a particular outlet configuration.

According to some embodiments, the switch 202 is configured to alter the reaction of the relay 110 to the presence of PoE power. For example, according to one embodiment, the switch 202 is coupled to the relay 110. In this embodiment, where the switch 202 is disposed in a first position, the relay 110 is configured to close when PoE power is present and to open when PoE power is absent. Further, in this embodiment, where the switch 202 is disposed in a second position, the relay 110 is configured to open when PoE power is present and to close when PoE power is absent. Thus, according to this embodiment, the switch 202 toggles the relay 110 between two separate configurations.

It is to be appreciated that, where the switch 202 is disposed in the second position, the power control apparatus 102 couples the grid power source 120 to controlled loads 122 via a load output of the relay 110 that is closed unless PoE power is present. This embodiment disconnects power from the controlled loads 122 when the relay 110 is actuated, rather than connecting power to the controlled loads 122 when the relay 110 is actuated.

In other embodiments, the relay 110 includes a plurality of load outputs. A first subset of the plurality of load outputs may be configured to be closed where PoE power is present in the relay 110 and to be open where PoE power is absent in the relay 110. A second subset of the plurality of load outputs may be configured to be closed where PoE power is absent from the relay 110 and to be open where PoE power is present in the relay 110. In these embodiments, each of the plurality of load outputs is coupled to one of a plurality of load outlets 114. Each of the plurality of load outlets 114 may be coupled to one or more of the controlled loads 122.

It is to be appreciated that, in these embodiments, any of the controlled loads 122 that are coupled to a load outlet 114 that is, in turn, coupled to a load output that is a member of the first subset are coupled to the grid power source 120 when PoE power is present in the relay 110 and are decoupled from the grid power source 120 when PoE power is absent from the relay 110. Additionally, any of the controlled loads 122 that are coupled to a load outlet 114 that is, in turn, coupled to a load output that is a member of the second subset are decoupled from the grid power source 120 when PoE power is present in the relay 110 and are coupled to the grid power source 120 when PoE power is absent from the relay 110.

As shown in FIG. 2, the side of the housing 200 includes a plurality of apertures through which the Ethernet+PoE input 106 and the Ethernet+PoE output 108 extend. As shown in FIG. 2, the Ethernet+PoE input 106 and the Ethernet+PoE output 108 are configured to accept RJ45 cable. In other embodiments, the Ethernet+PoE input 106 and the Ethernet+PoE output 108 are configured according to other standards and embodiments are not limited to a particular cable type or Ethernet+PoE input or Ethernet+PoE output configuration.

Figure 3:
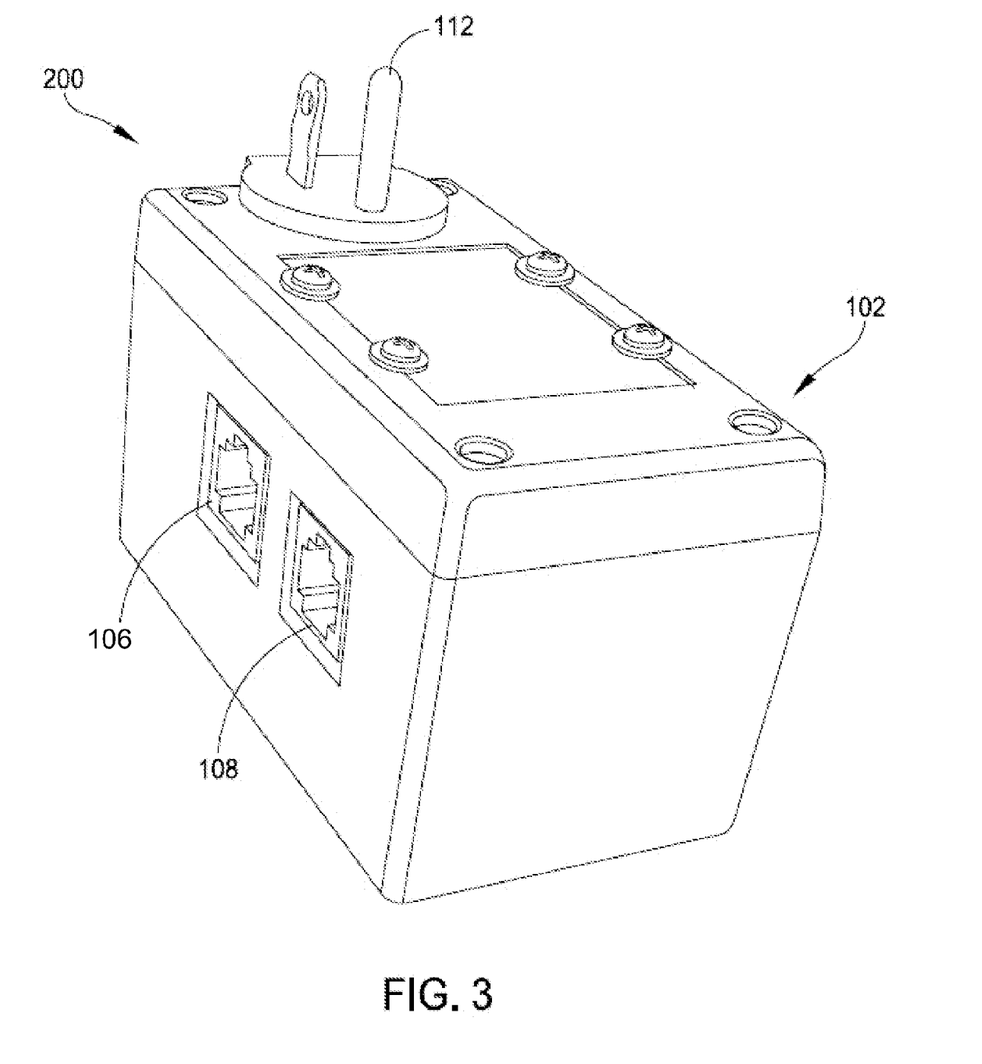
FIG. 3 is a perspective view of the back of one example of the power control apparatus.

FIG. 3 shows a perspective view of the back and the side of the housing 200. As shown in FIG. 3, the grid power inlet 112 extends through the back of the housing 200. The grid power inlet 112 shown in FIG. 2 is configured according to the NEMA 5-15 standard. In other embodiments, the grid power inlet 112 is configured according to other standards and embodiments are not limited to a particular inlet configuration.

Figure 4:
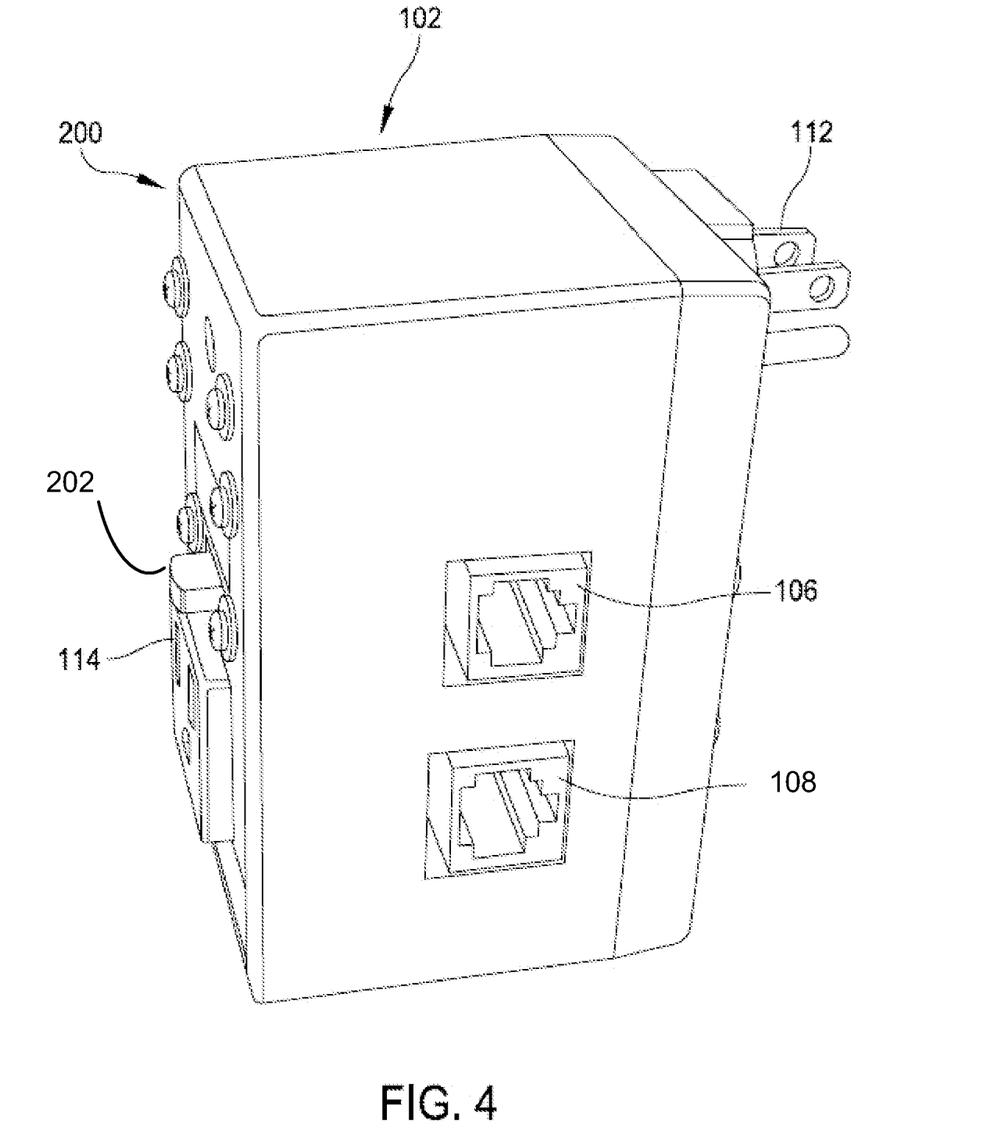
FIG. 4 is a perspective view of the side of one example of the power control apparatus.

FIG. 4 shows a perspective view of the side of the housing 200. As shown in FIG. 4, the grid power inlet 112 is disposed on a side opposite the grid power inlet 114 and the switch 202. In other embodiments, the grid power inlet 112 and the grid power outlet 114 are disposed on adjacent sides of the housing 200. In still other embodiments, the grid power outlet 114, the Ethernet+PoE input 106, and the Ethernet+PoE output 108 are disposed on a same side of the housing. In yet other embodiments, grid power outlet 114 includes a plurality of outlets, each configured to support a different outlet design standard. Thus embodiments are not limited to the particular arrangement of the element shown in FIGS. 2-4.

According to other embodiments, the configuration of the grid power inlet 112 and the grid power outlet 114 is customized for a particular geographical region. For example, the configuration of the grid power inlet 112 and the grid power outlet 114 may be customized to comply with the CEE 7/4 design or the CEE 7/5 design.

Other embodiments support different types of power couplers. For instance, in one embodiment the grid power inlet 112 is configured according to the C14 standard for use with C13 adaptor cable. In other embodiments, the grid power inlet 112 is configured according to the C20 standard for use with the C19 adaptor cable.

Figure 5:
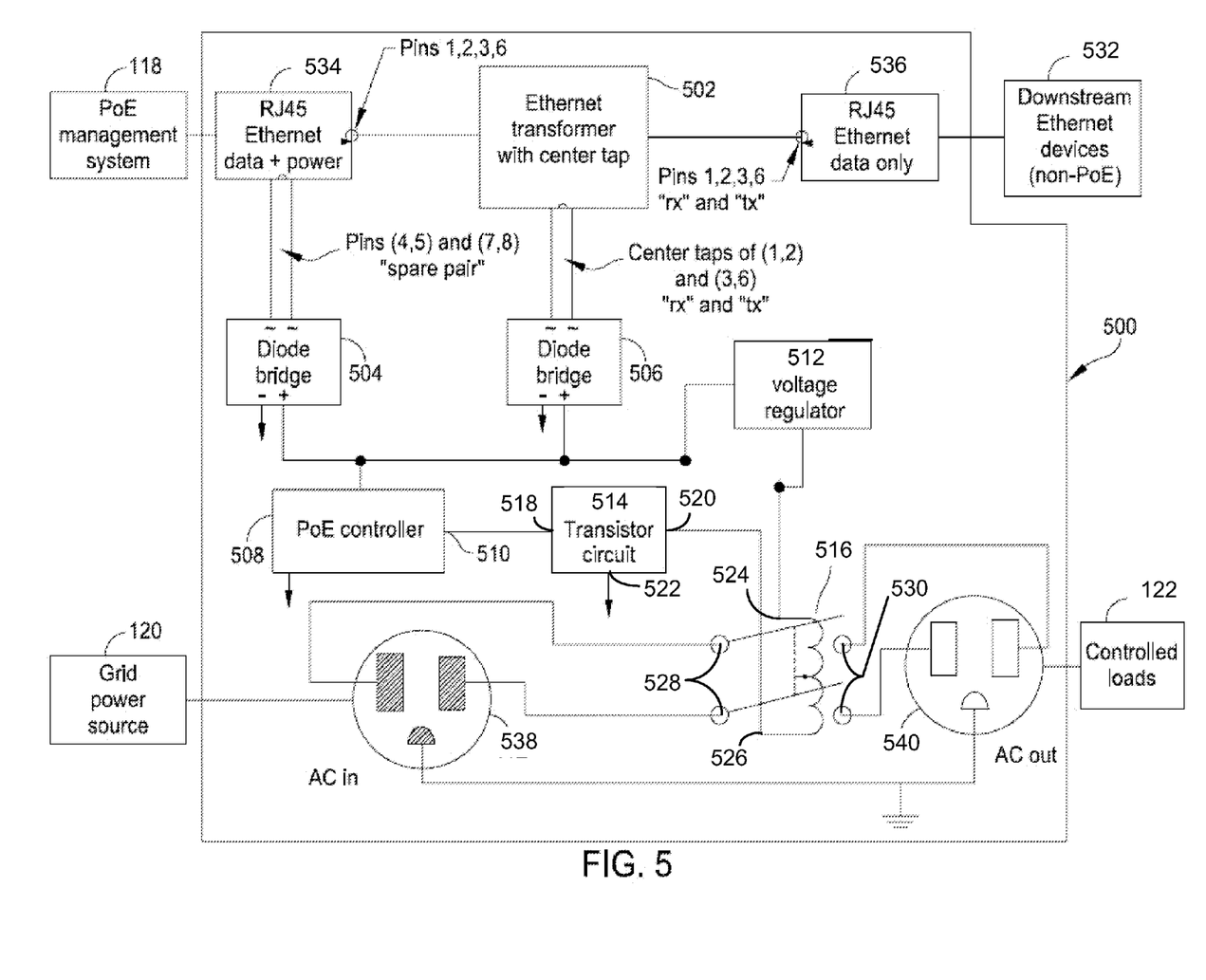
FIG. 5 is a schematic diagram of another example of the power control apparatus.

FIG. 5 illustrates an embodiment of a power control apparatus 500 within the context of several elements described above with reference to FIG. 1 and one or more downstream Ethernet devices 532 that do not require PoE power. The power control apparatus 500 includes an Ethernet+PoE input 534, an Ethernet transformer 502, an Ethernet output 536, a first diode bridge 504, a second diode bridge 506, a PoE controller 508, voltage regulator 512, a transistor circuit 514, a relay 516, a grid power inlet 538, and a grid power outlet 540. The PoE controller 508 includes a PoE power good output 510. The transistor circuit 514 includes a control input 518, a power input 520 and a power output 522. The relay 516 includes a control input 524, a control output 526, a load input 528 and a load output 530. As shown in FIG. 5, the power control apparatus 500 is coupled to one or more downstream Ethernet devices 532. In the illustrated example, the downstream Ethernet devices 532 include devices that do not require PoE power.

As shown in FIG. 5, the Ethernet+PoE input 534 is coupled to the Ethernet transformer 502 and the first diode bridge 504. The Ethernet transformer 502 is coupled to the Ethernet output 536. The Ethernet transformer 502 is also coupled to the second diode bridge 506 via a center taps of wire pairs (1, 2) and (3, 6). Both the first diode bridge 504 and the second diode bridge 506 are coupled to the voltage regulator 512 and the PoE controller 508. In the illustrated embodiment, the voltage regulator 512 is coupled to the control input 524 of the relay 516. In other embodiments, both the first diode bridge 504 and the second diode bridge 506 are coupled to the control input 524 of the relay 516 and the PoE controller 508 (i.e., the voltage regulator 512 is absent).

As shown in FIG. 5, the PoE controller 508 is coupled to the control input 518 of the transistor circuit 514 via the PoE power good output 510. The power input 520 of the transistor circuit 514 is coupled to the control output 526 of the relay 516. The power output 522 of the transistor circuit 514 is coupled to a PoE ground. The load input 528 of the relay 516 is coupled to the grid power inlet 538 and the load output 530 of the relay 516 is coupled to the grid power outlet 540. In the illustrated embodiment, the first diode bridge 504, the second diode bridge 506, the PoE controller 508, and the transistor circuit 514 are grounded to the PoE ground. The grid power inlet 538 and the grid power outlet 540 are grounded to an Earth ground.

As shown in FIG. 5, the Ethernet+PoE input 534 receives Ethernet signal from a network via wire pairs (1, 2) and (3, 6). In some embodiments, the Ethernet+PoE input 534 also receives PoE power that is superimposed on wire pairs (1, 2) and (3, 6). In other embodiments, the Ethernet+PoE input 534 receives PoE power via wire pairs (4, 5) and (7, 8). The Ethernet+PoE input 534 transmits the received Ethernet signal and any received superimposed PoE power to the Ethernet transformer 502. The Ethernet transformer 502, in turn, provides the Ethernet signal to the Ethernet output 536, thereby passively conducting the Ethernet signal through the power control apparatus 500.

Continuing with FIG. 5, the Ethernet+PoE input 534 transmits any PoE power received via wire pairs (4, 5) and (7, 8) to the first diode bridge 504. Similarly, the center taps of the Ethernet transformer 502 transmit any superimposed PoE power to the second diode bridge 506. The first diode bridge 504 and the second diode bridge 506 convert any DC power provided on their respective inputs into DC power of a known polarity.

In the embodiment shown in FIG. 5, the PoE controller 508 negotiates the provision of PoE power with power sourcing equipment according to IEEE 802.3at standard, which is hereby incorporated herein by reference in its entirety, although other processes of establishing PoE power may be used with the embodiments disclosed herein. Once the negotiation process is complete, the PoE controller 508 provides a control signal to the control input 518 of the transistor circuit 514 via the PoE power good output 510. In at least one embodiment, the transistor circuit 514 is an NPN bipolar junction transistor circuit of standard design and common practice where the base terminal is coupled to the PoE power good output 510, the emitter terminal is coupled to the PoE ground, and the collector terminal is coupled to the control output 526 of the relay 516. In the embodiment shown in FIG. 5, the transistor circuit 514 acts as a switch that controls the passage of current through the control input 524 of the relay 516. The optional voltage regulator 512 reduces the voltage of the PoE power provided to the relay 110 from 48 volts DC to a voltage suitable for closing the relay 110 (e.g., 3-5 volts DC). In other embodiments, the PoE power may be provided directly to the relay 516 without voltage regulation (e.g., where voltage needed to actuate the relay 516 is matched to the PoE power voltage).

When the transistor circuit 514 is on, the relay 516 receives the PoE power via the first diode bridge 504 or the second diode bridge 506 and the relay 516 closes, thereby completing a circuit including the grid power inlet 538 and the grid power outlet 540. When the transistor circuit 514 is off, current from the PoE power is not passed through the relay 516 via the transistor circuit 514 and the relay 516 opens, thereby breaking the circuit at the grid power outlet 540. In this way, the power control apparatus 500 may provide, or not provide, AC power received from the grid via the grid power inlet 538 to a plug load coupled to the grid power outlet 540.

In some examples, the power control apparatus 102 may separate the Ethernet signal from the PoE power. While the power control apparatus 500 may still be used to control the power supplied to a plug load, the power control apparatus 500 may pass the Ethernet signal to a device, other than the plug load, that requires network connectivity, thereby increasing the utility of the power control apparatus 500 within an integrated power management solution.

The components used within embodiments illustrated by FIG. 5 may incorporate various models of components source from a variety of manufacturers. For instance, according to one embodiment, the Ethernet transformer 502 is a Pulse H2019 transformer available from Pulse Electronics Corporation of San Diego, Calif. In another embodiment, the PoE controller 508 is a Texas Instruments TP2375 controller available from Texas Instruments, Inc. of Dallas, Tex.

It is to be appreciated that at least some of the embodiments disclosed herein are passive apparatus that do not include a microcontroller or any sort of central processing unit. In addition, it is to be appreciated that at least some of the embodiment disclosed herein consume no power unless power is being provided to a plug load. Both of these features allow for low cost production and low cost operation, and both of these features stand in contrast to at least some conventional devices used to control power. Moreover, while the embodiments disclosed above utilize PoE standards for cabling, voltage, and data transmission, the embodiments disclosed herein are not limited to a particular standard.

Power Control Processes

Figure 6:
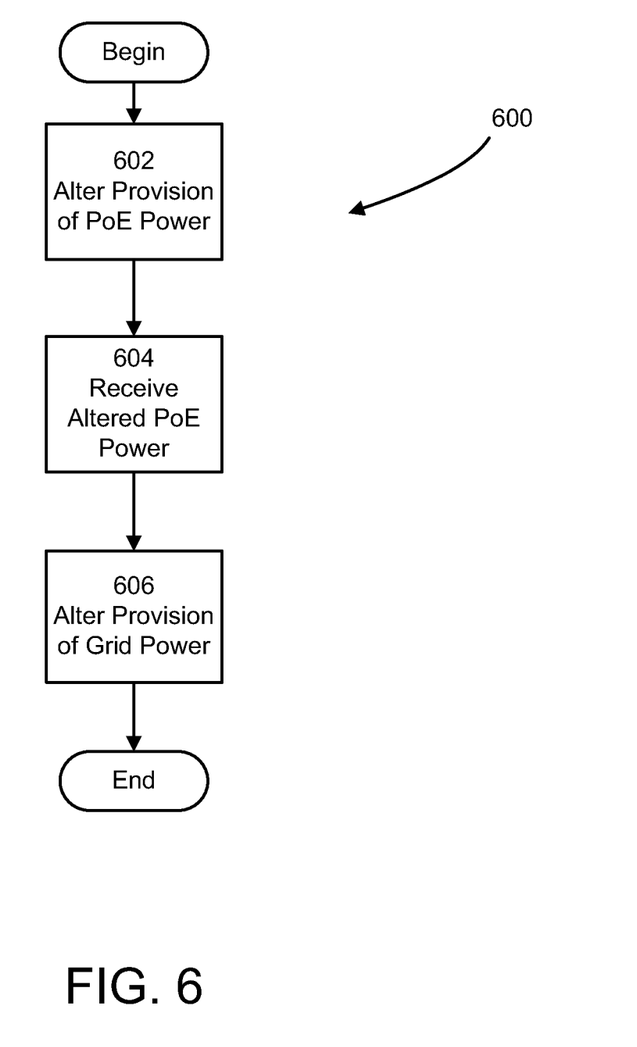
FIG. 6 is a flow diagram illustrating an exemplary power control process.

Some embodiments provide power control processes in which an integrated power management system, such as the integrated power management system 100 described above with reference to FIG. 1, receives grid power from a grid power source and controls grid power supplied to one or more plug loads using one or more power control apparatus, such as the power control apparatus 102, 200, and 500 described above with reference to FIGS. 1, 2-4, and FIG. 5, respectively. FIG. 6 illustrates one example of such a power control process, the power control process 600. As shown in FIG. 6, the power control process 600 includes acts of altering provision of PoE power, receiving the altered PoE power at the power control apparatus, and altering the provision of grid power.

In act 602, the integrated power management system 100 alters the PoE power provided to the power control apparatus. This alteration may be an increase in PoE power supplied or a decrease in the PoE power supplied. In some embodiments, PoE power sourcing equipment, such as a CISCO 1811 Integrated Services Router, included in the integrated power management system 100 alters the PoE power provided to the power control apparatus in response to a command received by other elements of the integrated power management system 100. In at least one embodiment, the command to alter the PoE power is encoded in accord with the CISCO ENERGYWISE protocol.

In act 604, the power control apparatus receives the altered PoE power. As described above, in at least some embodiments, the power control apparatus conducts the altered PoE power through a variety of components. These components may include a PoE controller and a transistor, such as the PoE controller 508 and the transistor circuit 514 described above with reference to FIG. 5. In at least one embodiment, the PoE controller negotiates provision of PoE power with the power sourcing equipment. In another embodiment, the voltage regulator 512 modifies the PoE power it receives to have a set of characteristics suitable to actuate a relay, such as the relay 110 described above with reference to FIG. 1. Further, in some embodiments, the power control apparatus provides any residual PoE power (e.g., power not used to drive the relay) to an external device via PoE cabling coupled to the power control apparatus.

In act 606, the power control apparatus alters provision of the grid power by providing the altered PoE power to the relay. In response to receiving the altered PoE power, the relay actuates (e.g., opens or closes). Where closed, the relay completes a circuit that provides grid power to a plug load. Where open, the relay breaks the circuit that provides grid power to the plug load.

Having thus described several aspects of at least one embodiment, it is to be appreciated that various alterations, modifications, and improvements will readily occur to those skilled in the art. For instance, although some examples and embodiments disclosed herein utilize PoE power to drive a relay, other examples and embodiments may include a relay that is driven by low voltage power with characteristics different from PoE power, such as power with the characteristics described in the Internet 0 specification which is under development by Schneider Electric and others. In addition, examples and embodiments disclosed herein may also be used in other contexts. Such alterations, modifications, and improvements are intended to be part of this disclosure, and are intended to be within the scope of the examples and embodiments discussed herein. Accordingly, the foregoing description and drawings are by way of example only. In addition, the various "Ethernet+PoE" inputs and "Ethernet+PoE" outputs described herein may also referred to simply as "PoE" inputs and "PoE" outputs without altering the meaning or scope of these terms.

What is claimed is:

1. A power control system comprising a power control apparatus, the power control apparatus including:
    a grid power inlet configured to receive grid power;
    a grid power outlet configured to provide grid power;
    a data transmission output;
    a data transmission input configured to receive low voltage power;
    a voltage regulator configured to receive the low voltage power and provide regulated low voltage power at an output;
    a relay coupled to the voltage regulator, the grid power inlet and the grid power outlet, the relay being configured to selectively couple the grid power inlet to the grid power outlet in response to receiving the regulated low voltage power from the voltage regulator; and
    a switch configured to selectively couple the voltage regulator to the relay,
    wherein the power control apparatus is configured to receive a communication signal via the data transmission input, transmit the communication signal via the data transmission output, and provide residual low voltage power via the data transmission output.

2. The power control system according to claim 1, wherein the relay is configured to open in response to receiving the regulated low voltage power, thereby decoupling the grid power inlet from the grid power outlet.

3. The power control system according to claim 1, wherein the relay is configured to close in response to receiving the regulated low voltage power, thereby coupling the grid power inlet to the grid power outlet.

4. The power control system according to claim 1, wherein the power control apparatus further includes a controller configured to negotiate provision of the low voltage power.

5. The power control system according to claim 1, further comprising a PoE management system including power sourcing equipment, the power sourcing equipment being configured to provide the low voltage power to the power control apparatus.

6. The power control system according to claim 5, wherein the PoE management system controls provision of the low voltage power via an ENERGYWISE protocol.

7. The power control system according to claim 6, further comprising a load coupled to the grid power outlet, wherein the PoE management system controls provision of grid power received at the grid power inlet to the load.

8. The power control system of claim 1, further comprising a second switch configured to change the relay between a first configuration and a second configuration, wherein the relay is configured to close when the regulated low voltage power is present and to open when the regulated low voltage power is absent in the first configuration, and wherein the relay is configured to close when the regulated low voltage power is absent and to open when the regulated low voltage power is present in the second configuration.

9. A method of managing provision of grid power using a power control apparatus, the method comprising:
    receiving, by a grid power inlet, grid power;
    providing, by a grid power outlet, the grid power to a load coupled to the power control apparatus;
    receiving, at a data transmission input, low voltage power;
    providing, by the power control apparatus, the low voltage power to a voltage regulator;
    providing, by the voltage regulator, regulated low voltage power;
    actuating, by the power control apparatus, a switch to selectively couple the voltage regulator to a relay;
    coupling, by the relay, the grid power inlet to the grid power outlet selectively in response to receiving the regulated low voltage power from the voltage regulator;
    receiving, via the data transmission input, a communication signal;
    transmitting, via a data transmission output, the communication signal; and
    providing, via the data transmission output, residual low voltage power.

10. The method according to claim 9, wherein selectively coupling the grid power inlet to the grid power outlet includes decoupling a source of the grid power from the grid power outlet.

11. The method according to claim 9, wherein selectively coupling the grid power inlet to the grid power outlet includes coupling a source of the grid power to the grid power outlet.

12. The method according to claim 9, wherein providing the low voltage power to the voltage regulator includes negotiating provision of the low voltage power with a source of the low voltage power.

13. The method according to claim 9, further comprising providing, by a PoE management system including power sourcing equipment, the low voltage power to the power control apparatus.

14. The method according to claim 13, wherein providing the low voltage power to the power control apparatus includes reading stored information encoded according to an ENERGYWISE protocol.

15. The method according to claim 9, further comprising providing the grid power from a grid power source to the load coupled to the power control apparatus.

16. The method of claim 9, further comprising steps of changing, by a second switch, the relay between a first configuration and a second configuration, wherein the relay is configured to close when the regulated low voltage power is present and to open when the regulated low voltage power is absent in the first configuration, and wherein the relay is configured to close when the regulated low voltage power is absent and to open when the regulated low voltage power is present in the second configuration.

17. A power control apparatus comprising:
    a grid power inlet configured to receive grid power;
    a grid power outlet configured to provide grid power;
    a data transmission output;
    a data transmission input configured to receive low voltage power;
    a voltage regulator configured to receive the low voltage power and provide regulated low voltage power at an output;
    a switch configured to selectively couple the voltage regulator to a relay; and
    means for actuating the relay to selectively couple the grid power inlet to the grid power outlet in response to receiving the regulated low voltage power from the voltage regulator,
    wherein the power control apparatus is configured to receive a communication signal via the data transmission input, transmit the communication signal via the data transmission output, and provide residual low voltage power via the data transmission output.

18. The power control apparatus of claim 17, further comprising a second switch configured to change the relay between a first configuration and a second configuration, wherein the relay is configured to close when the regulated low voltage power is present and to open when the regulated low voltage power is absent in the first configuration, and wherein the relay is configured to close when the regulated low voltage power is absent and to open when the regulated low voltage power is present in the second configuration.

* * * * *